UNITED STATES PATENT OFFICE.

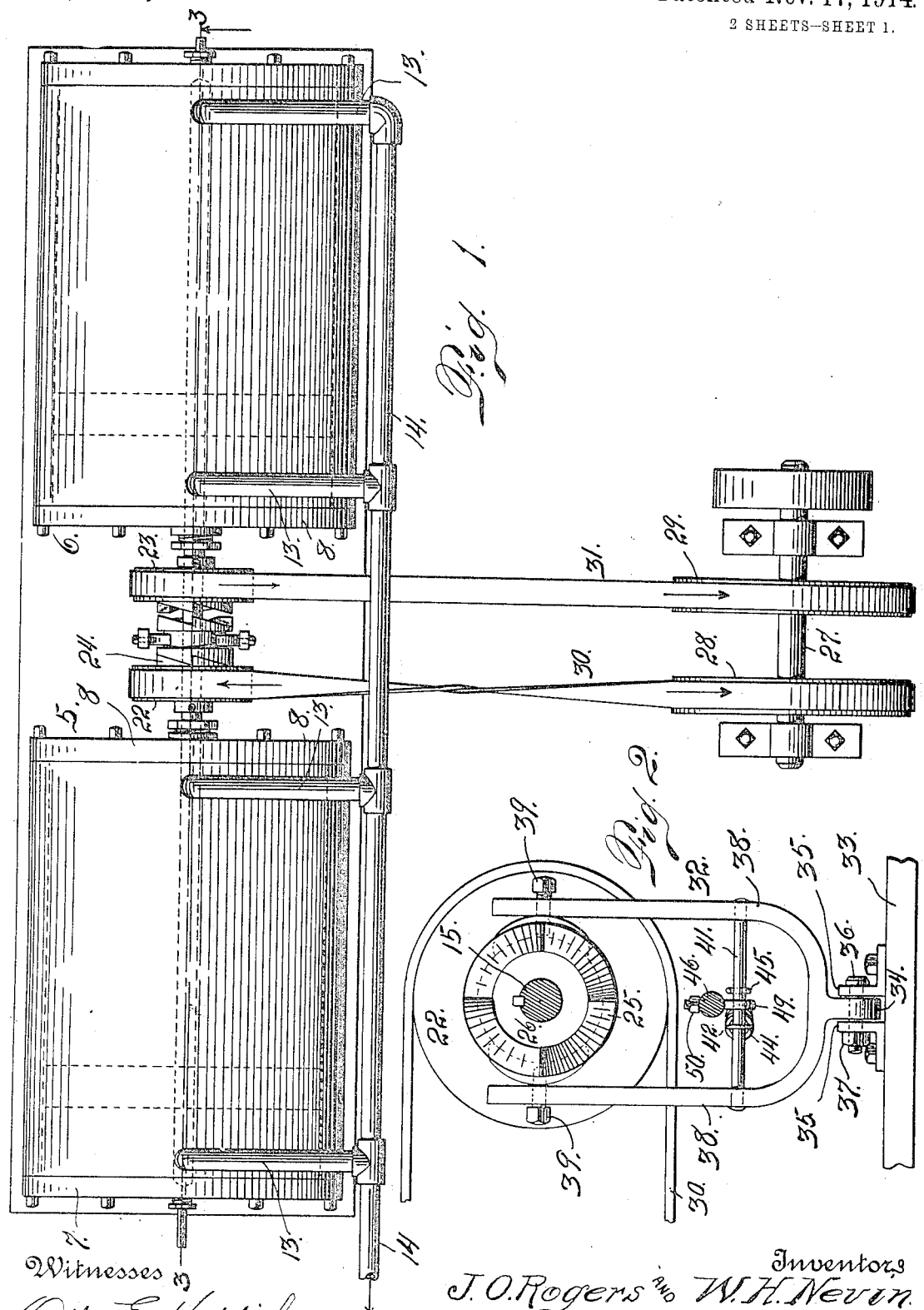

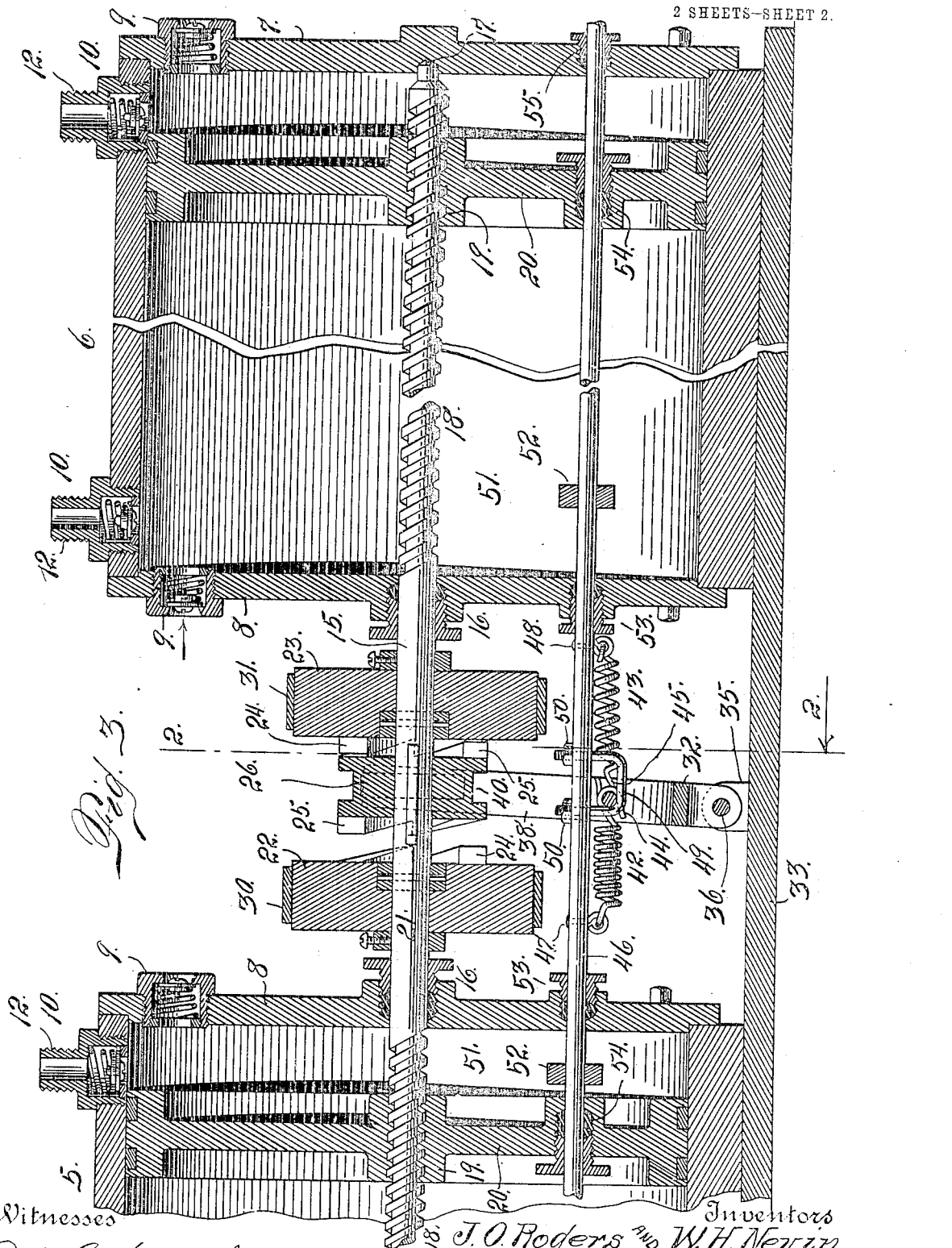

JAMES O. ROGERS AND WILLIAM H. NEVIN, OF DENVER, COLORADO.

AIR-COMPRESSOR.

1,117,911.      Specification of Letters Patent.      Patented Nov. 17, 1914.

Application filed February 11, 1914. Serial No. 818,015.

*To all whom it may concern:*

Be it known that we, JAMES O. ROGERS and WILLIAM H. NEVIN, citizens of the United States, residing at 89 Sherman street, city and county of Denver, and State of Colorado, have invented certain new and useful Improvements in Air-Compressors; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in air compressors, our object being to provide an efficient and economical construction of this class.

As illustrated in the drawing, the apparatus consists of two cylindrical chambers in which is journaled a shaft having a screw-threaded portion entering cylinder, upon which is threaded a piston which is caused to travel back and forth in the chamber by rotating the screw shaft in opposite directions. Interposed between the chambers and loosely mounted on the screw shaft are pulleys or other suitable wheels which are connected with a source of power to rotate them in reverse directions. Splined on the shaft between the two pulleys is a double clutch, the pulleys having clutch faces arranged to coöperate with the faces of the clutch. Connected with this clutch is a yoke arranged to be utilized for shifting the clutch from engagement with one pulley into operative engagement with the other pulley, for the purpose of reversing the rotary travel of the shaft. Provision is made for automatically actuating the yoke for the purpose stated, the pistons within the cylinders serving, through the instrumentality of suitable mechanism, to accomplish this purpose.

Having briefly outlined our improved construction, we will proceed to describe the same in detail, reference being made to the accompanying drawing, in which is illustrated an embodiment thereof.

In the drawing,—Figure 1 is a top plan view of our improved air compressor. Fig. 2 is a section taken on the line 2—2, Fig. 3, looking toward the left. Fig. 3 is a sectional view, taken through the apparatus on the line 3—3, Fig. 1, parts being broken away and the structure disclosed, shown on a larger scale.

The same reference characters indicate the same parts in all the views.

Let the numerals 5 and 6 designate two cylinders which are suitably mounted and equipped with heads 7 and 8. Each head of each cylinder is provided with an inwardly opening check valve 9, while adjacent each head is located an outwardly opening check valve 10. The check valves 9 are inlet valves, while the check valves 10 are outlet valves, through which the compressed air passes. The casings of the check valves 10 terminate in exterior nipples 12 which are connected with branch pipes 13 leading to and communicating with a main conduit 14 which may lead to a reservoir, not shown.

Journaled within the heads of the two cylinders is a shaft 15 which passes through stuffing boxes 16 with which the inner heads of the cylinders are equipped. The outer extremities of the shaft engage recesses 17 formed in the inner surfaces of the heads 7 of the cylinders. The portion 18 of the shaft within each cylinder is threaded to engage a correspondingly threaded hub 19 with which each piston 20 is provided. The pistons are arranged to move back and forth within their cylinders by virtue of the rotary action of the shaft in reverse direction, the pistons traveling upon the threaded portions of the shaft, as will be readily understood.

As illustrated in the drawing, the inner heads 8 of the two cylinders are suitably spaced, leaving the central portion 21 of the shaft exposed. Upon this portion 21 of the shaft are mounted two loose pulleys 22 and 23 whose inner surfaces are provided with clutch faces 24 adapted to coöperate with adjacent faces 25 formed on a double clutch 26 which is splined on the shaft, the space between the two pulleys being sufficient to permit the clutch to be shifted to bring either of its faces into coöperative engagement with the adjacent clutch face of either pulley, whereby when the clutch is in coöperative engagement with the clutch face of either pulley, it is out of engagement with the clutch face of the other pulley. As illustrated (see Fig. 1), the pulleys 22 and 23 are connected with an operating shaft 27 by means of other pulleys 28 and 29 fast on the shaft 27, belts 30 and 31 being employed to connect the two pairs of pulleys on the two shafts. The belt 30 connects the pulleys 22 and 28, this belt being crossed; while the belt 31 connects the two pulleys 23 and 29, being a straight belt. From this it will be understood that when the apparatus is in use the two pulleys 22 and 23 on the shaft 15 will be rotated in reverse directions; hence, when it is desired to rotate the same shaft in the opposite direction, the said clutch is shifted to disengage the pulley 22 and engage the pulley 23. By virtue of this adjustment the pistons 20 are caused to move in reverse directions within their chambers for air compression purposes.

The manner of automatically shifting the clutch 26 will now be explained. A U-shaped yoke 32 is pivotally mounted at its lower extremity upon a stationary support 33. For this purpose the yoke is equipped with a lug 34 perforated to register with perforations formed in angle brackets 35 secured to the part 33. The yoke is pivotally connected with these brackets by means of a bolt 36 passing through the registering openings of the brackets and lug, a nut 37 being employed to keep the bolt in place. The two parallel arms 38 of the yoke extend upwardly and are equipped with inwardly projecting bolts 39 which enter a circumferential groove 40 formed in the central portion of the clutch 26. By virtue of this arrangement, as the yoke is moved in either direction,—that is to say, toward the right or left, upon its pivot bolt (see Fig. 3), the clutch will be shifted toward one of the pulleys 22 or 23 and away from the other pulley. When a suitable degree of movement is imparted to the yoke, the clutch 26 will be thrown into operative engagement with the clutch face of one of these pulleys.

At a suitable distance below the shaft 15 the yoke arms 38 are equipped with a transversely arranged pin 41 with which the inner extremities of two spiral springs 42 and 43 are connected, as shown at 44 and 45. The opposite extremities of these springs are secured to a relatively long rod 46, as shown at 47 and 48. The rod 46 is connected with the pin 41 of the yoke by means of a U-bolt 49 whose arms pass through the rod 46 and are secured by nuts 50, the arms of the U-bolt straddling the pin 41.

The rod 46 within each chamber 51 is equipped with a stop block 52 located near the inner end of the chamber. This rod passes through stuffing boxes 53 in the heads 8 of the cylinders and stuffing boxes 54 of the pistons, and also through stuffing boxes 55 in the outer heads 7 of the cylinders. By virtue of this construction the rod 46 is endwise movable in both heads of both cylinders, air-tight joints being formed through the medium of the stuffing boxes.

The movement of the rod 46 for the purpose of automatically actuating the yoke 32, whereby the clutch 26 is shifted from engagement with one pulley of the shaft 15 and into engagement with the other pulley for the purpose of reversing the rotary travel of the said shaft, will now be explained by referring to Fig. 3 of the drawing. The piston 20 within the cylinder 5 has approached its head 8 near enough to engage the stop 52 on the rod, whereby the latter has been shifted toward the right far enough to place the spring 43 under sufficient tension to shift the yoke toward the right, whereby a corresponding movement has been imparted to the clutch 26, this movement being sufficient to disengage the face 25 of the said clutch from the companion face 24 of the pulley 22 and cause the opposite face of the clutch to engage the companion clutch face 24 of the pulley 23. When the rod 46 has been shifted sufficiently for this purpose, the left-hand arm of the U-bolt 49 has been brought into engagement with the pin 41 of the yoke, thus positively locking the yoke in the adjusted position until a reverse endwise movement is imparted to the rod 46.

As disclosed in Fig. 3, the piston 20 of the cylinder 5 has actuated the rod 46 by virtue of its engagement with the stop 52, and has commenced its travel in the opposite direction, due to the fact that the shifting of the clutch, as just explained, from engagement with the pulley 22 into engagement with the pulley 23 has resulted in reversing the rotary travel of the shaft 15, whereby both of the pistons 20 of the two cylinders begin their movement in the opposite direction. As these two pistons approach their limit of movement toward the left, the piston 20 of the cylinder 6 will act upon the stop 52 within the same cylinder and shift the rod 46 toward the left a sufficient distance to reverse the position of the yoke 32 and shift the clutch 26 from engagement with the pulley 23 and into engagement with the pulley 22, whereby the rotary action of the shaft will be again reversed; which will cause the pistons of the two cylinders to move again toward the right. In this way the shaft 15 is automatically caused to rotate in reverse directions for the purpose stated.

Assuming that the pistons 20 of the two cylinders are traveling toward the left (see Fig. 3), atmospheric air will enter the cylinders at the right of the pistons, through the ports controlled by the two valves 9 of the heads 7 and 8 of the cylinders. At the same time the exit valves 10 adjacent the right-hand heads of the cylinders will remain closed, both by virtue of the springs acting upon them, and also by the suction or partial vacuum condition produced within the cylinders at the right of the pistons.

During the travel of these pistons within their cylinders toward the left, the inlet valves 9 of the left-hand heads of the cylinders will be closed, while the exit valves 10 near the left-hand heads of the cylinders will open as soon as the compression of the air has become sufficient for the purpose, and the compressed air will pass out through the ports controlled by the check valves 10, into the branch pipes 13, and thence into the main conduit 14 leading to the receiver, not shown. As the pistons approach their limit of travel toward the left within the cylinders, the piston within the cylinder 6 will act upon the stop 52 of the rod 46 and move the latter endwise sufficiently to shift the yoke 26 from engagement with the pulley 23 into engagement with the pulley 22, whereby the rotary action of the shaft will be reversed, and the two pistons will begin to travel toward the right within their cylinders; and as they approach their right-hand heads, the piston 20 within the cylinder 5 will act upon a stop 52 of the rod and shift the latter endwise toward the right a sufficient distance to again move the clutch 26 toward the left and out of engagement with the pulley 22 and into engagement with the pulley 23, through the instrumentality of the spring 43, which is placed under sufficient tension for the purpose, as heretofore explained.

Having thus described our invention, what we claim is:

1. The combination of two chambers having inlet and outlet check valves at both extremities, pistons therein, a shaft journaled in the chambers and having threaded portions therein on which the pistons are mounted, wheels loose on the shaft and rotating in reverse directions, a double clutch splined on the shaft between the wheels, which are equipped with clutch members arranged to coöperate with the adjacent faces of the clutch, a yoke engaging the clutch, a rod endwise slidable in the chambers and passing through openings in the pistons, springs connecting the yoke and rod on opposite sides of the yoke, a stop on the rod within each chamber arranged to be engaged by the piston therein to shift the rod to release one spring and place the other spring under tension, whereby the yoke is actuated to shift the clutch from coöperative engagement with one wheel into corresponding engagement with the other wheel for the purpose of reversing the travel of the shaft as the pistons approach the extremities of their chambers in either direction.

2. The combination of two separated chambers having inlet and outlet check valves at both extremities, a shaft journaled therein and having threaded portions within the chambers, pistons threaded on the shaft within the chambers, loose wheels mounted on the shaft between the chambers, a double clutch splined on the shaft between the two wheels which are equipped with clutch faces, an oscillating member connected with the clutch, and means for automatically actuating the said member to cause the clutch to disengage the clutch face of one wheel and engage the corresponding face of the other wheel as the pistons approach the extremities of their chambers in either direction, said means comprising a rod endwise slidable in the chambers and passing through openings in the pistons, the rod within each chamber arranged to be engaged by the piston therein and an operative connection between the said rod and oscillating member, for the purpose set forth.

3. The combination of two chambers having inlet and outlet check valves at both extremities, pistons therein, a shaft journaled in the chambers and having threaded portions therein on which the pistons are mounted, wheels loose on the shaft and rotating in reverse directions, a double clutch splined on the shaft between the wheels, which are equipped with clutch members arranged to coöperate with the adjacent faces of the clutch, a yoke engaging the clutch, a rod endwise slidable in the chambers, springs connecting the yoke and the rod on opposite sides of the yoke, the rod within each chamber arranged to be engaged by the piston therein to shift the rod to release one spring and place the other under tension, whereby the yoke is actuated to shift the clutch from coöperative engagement with one wheel into corresponding engagement with the other wheel for the purpose of reversing the travel of the shaft as the piston approaches the extremities of their chambers in either direction.

In testimony whereof we affix our signatures in presence of two witnesses.

JAMES O. ROGERS.
WILLIAM H. NEVIN.

Witnesses:
  A. J. O'BRIEN,
  A. EBERT O'BRIEN.